US010008882B2

(12) United States Patent
Venderbosch et al.

(10) Patent No.: US 10,008,882 B2
(45) Date of Patent: Jun. 26, 2018

(54) POWER TRANSFER SYSTEM

(71) Applicant: USE SYSTEM ENGINEERING HOLDING B.V., Haaksbergen (NL)

(72) Inventors: Herbert Venderbosch, Bathmen (NL); Raymond Kaspers, Enschede (NL); Martinus Peter Eikendal, Almelo (NL); Steven Ferdinand Boks, Almelo (NL); Johannes Hermanus Maria Van Der Kuil, Haaksbergen (NL)

(73) Assignee: USE SYSTEM ENGINEERING HOLDING B.V., Haaksbergen (NL)

( * ) Notice: Subject to any disclaimer, the term of this patent is extended or adjusted under 35 U.S.C. 154(b) by 284 days.

(21) Appl. No.: 14/787,020

(22) PCT Filed: Apr. 23, 2014

(86) PCT No.: PCT/EP2014/058256
§ 371 (c)(1),
(2) Date: Oct. 26, 2015

(87) PCT Pub. No.: WO2014/173962
PCT Pub. Date: Oct. 30, 2014

(65) Prior Publication Data
US 2016/0105035 A1    Apr. 14, 2016

(30) Foreign Application Priority Data

Apr. 26, 2013  (EP) .................... 13165635

(51) Int. Cl.
*H01F 27/42*  (2006.01)
*H01F 37/00*  (2006.01)
(Continued)

(52) U.S. Cl.
CPC .............. *H02J 50/12* (2016.02); *H02J 5/005* (2013.01)

(58) Field of Classification Search
CPC .. H02J 50/12; H02J 5/005; H02J 7/025; H02J 17/00; H04B 5/0037; H01F 38/14
(Continued)

(56) References Cited

U.S. PATENT DOCUMENTS 5,293,308 A  3/1994 Boys et al.
6,483,202 B1  11/2002 Boys
(Continued)

FOREIGN PATENT DOCUMENTS

EP  1 898 510 A1  3/2008
JP  08308152 A  11/1996
(Continued)

OTHER PUBLICATIONS

International Search Report issued in PCT/EP2014/058256 dated Jul. 21, 2014.
(Continued)

*Primary Examiner* — Carlos Amaya
(74) *Attorney, Agent, or Firm* — RatnerPrestia

(57) ABSTRACT

Power transfer system including a transfer pick-up circuit for inductively picking up power from a cable carrying an alternating supply current. The power transfer system includes a first circuit having the secondary winding of a transformer for providing an inductive coupling to the cable and a first capacitive module connected in parallel to the transformer. The transfer pick-up circuit further includes a second circuit connected in parallel to the first circuit and has a second inductive module and a connection to transfer power to the load, the connection being in series with the second inductive module.

11 Claims, 9 Drawing Sheets

(51) Int. Cl.
*H01F 38/00* (2006.01)
*H02J 50/12* (2016.01)
*H02J 5/00* (2016.01)

(58) Field of Classification Search
USPC .................................................. 307/104
See application file for complete search history.

(56) References Cited

U.S. PATENT DOCUMENTS

| | | | |
|---|---|---|---|
| 8,093,758 | B2 | 1/2012 | Hussmann et al. |
| 2007/0109708 | A1 | 5/2007 | Hussman et al. |
| 2007/0120421 | A1* | 5/2007 | Boys ............... H02J 5/005 307/11 |
| 2009/0302688 | A1 | 12/2009 | Boys |
| 2011/0116290 | A1 | 5/2011 | Boys |
| 2011/0221277 | A1 | 9/2011 | Boys |

FOREIGN PATENT DOCUMENTS

| | | | |
|---|---|---|---|
| JP | 2002354711 A | | 12/2002 |
| JP | 2009539343 A | | 11/2009 |
| WO | 2007139401 A2 | | 12/2007 |
| WO | WO 2009/061219 A2 | | 5/2009 |
| WO | 2013024385 A2 | | 2/2013 |

OTHER PUBLICATIONS

International Preliminary Report on Patentability (IPER) issued in PCT/EP2014/058256 dated Oct. 27, 2015.
IPOS Search Report issued in Singapore Application No. 11201508310S dated May 3, 2016 (3 pages).
IPOS Written Opinion issued in Singapore Application No. 11201508310S dated May 3, 2016 (4 pages).
Keeling, "A Unity-Power-Factor IPT Pickup for High-Power Applications", IEEE Transactions on Industrial Electronics, VOl. 57, No. 2, Feb. 2010, pp. 744-751.
Pantic, "Framework and Topology for Active Tuning of Parallel Compensated Receivers in Power Transfer Systems", IEEE Transactions on Power Electronics, vol. 27, No. 11, Nov. 2012, pp. 4503-4513.
Chinese Office Acton for Chinese Application No. 201480023473.1, dated Jun. 6, 2017 with translation, 18 pages.
Notification of Reasons for Refusal for Japanese Application No. 2016-509451, dated Sep. 9, 2017 with translation, 11 pages.

* cited by examiner

POWER TRANSFER SYSTEM

CROSS REFERENCE TO RELATED APPLICATIONS

This application is the U.S. National Phase Application of PCT Application No. PCT/EP2014/058256, filed Apr. 23, 2014, which claims priority to European Patent Application No. EP 13165635.7, filed Apr. 26, 2013, the contents of such applications being incorporated by reference herein.

FIELD OF THE INVENTION

The invention relates to a power transfer system comprising a transfer pick-up circuit for inductively picking up power from a cable carrying an alternating supply current.

BACKGROUND OF THE INVENTION

U.S. Pat. No. 8,093,758 describes a power transfer system for inductively coupled power transfer (ICPT). It describes a circuit having a primary conductive path supplied with alternating current from a power supply comprising a resonant converter. It also describes inductively coupling a secondary circuit to the first circuit using a transformer. The secondary circuit comprises a winding and a capacitor whereby the capacitor is connected in parallel to the winding. The winding forms an inductive element. A load is parallel to the inductive element and the capacitor. A controlled shorting switch is used to decouple the pick-up and thereby regulate the impedance to the primary conductive path. Without the short, the secondary circuit would resonate. The controlled shorting switch is parallel to the inductive capacitor and the inductive element. Because the controlled shorting switch causes large conduction losses and to allow for frequency variations of the current in the primary path, U.S. Pat. No. 8,093,758 describes the use of a variable inductor or a variable capacitor in parallel to the inductive element and the capacitor. The power transfer system comprises sensing means to sense a condition of the load and control means to selectively tune or de-tune the secondary circuit in response to load conditions sensed by the sensing means by varying the effective capacitance or inductance of the secondary circuit to control the transfer of power to the secondary circuit dependent on the sensed load condition. The control means comprises two switches with appropriate drivers to control the current flowing through an inductor or capacitor that thereby becomes variable. The sensing means sense the phase of a voltage in the resonant circuit. The control means is adapted to drive switching means to connect the variable inductor or to disconnect the variable capacitor to the secondary circuit a predetermined time period after a voltage zero crossing. Thereby the control means varies the variable inductance or variable capacitor such that the resonant frequency is detuned away from resonance (the track frequency) when the load is small and does not need high power to be transferred through the secondary circuit. The secondary circuit is tuned toward the track frequency as the load increases and high power transfer is required to satisfy the demand from the increased load.

A disadvantage of the power transfer system as described in U.S. Pat. No. 8,093,758 is that a relatively expensive controller is needed and that the output voltage to the load must be sensed. Moreover, the switches cause noise in the pick-up circuit and therefore on the primary path when switching. This noise may disturb the function of other pick-ups coupled to the cable or may require that the power supply is robust against this noise in that the alternating current is not effected and remains as intended.

SUMMARY OF THE INVENTION

An aspect of the present invention is to amerliorate one or more of these problems or to at least provide an alternative power transfer system.

A power transfer system according to an embodiment of the invention, comprising a transfer pick-up circuit for inductively picking up power from a cable carrying an alternating supply current, comprising
  a first circuit comprising the secondary winding of a transformer for providing an inductive coupling to the cable and a first capacitive module connected in parallel to the transformer;
characterized by
  the transfer pick-up circuit comprising
  a second circuit connected in parallel to the first circuit and comprising a second inductive module and means to transfer power to a load, the means being in series with the second inductive module.

The secondary winding, the first capacitive module, the second inductive module, the means and where present the load together form a transfer pick-up circuit. The transfer pick-up circuit is a resonant circuit, i.e. a circuit that can resonate depending on the frequency of the alternating supply current.

The second inductive module, the first capacitive module and the secondary winding of the transformer together form a low pass filter for noise in the direction of the cable. Thus noise from the load or the means is filtered. Therefore a source of the alternating supply current on the cable does not have to be very robust and other inductively coupled power transfer pick-up circuits coupled to the cable can function optimally.

Preferably the alternating supply current alternates at a cable frequency and the first circuit has a first resonance in a first frequency range around a first resonance frequency below the cable frequency and the power transfer system is arranged such that when in use the second circuit forms an infinitely high impedance, the transformer is not saturated at the cable frequency.

The secondary winding can be modelled as an ideal transformer winding and a magnetizing inductance parallel to the ideal transformer winding. The ideal transformer winding has zero impedance, i.e. the inductance, resistance and capacitance of the ideal transformer are zero.

In the transfer pick-up circuit, the second circuit is parallel to the first circuit. By placing the second circuit parallel to the first circuit, the impedance of the second circuit is parallel to the impedance of the first circuit. Therefore, when the impedance of the second circuit is high compared to the impedance of the first circuit, the behaviour of the first circuit becomes dominant. Moreover, if the second circuit forms an infinitely high impedance during use, the second circuit effectively plays no role.

In practise, resonance peaks of circuits do not have an infinitely small width but have a resonance in a frequency range. In this embodiment, the first frequency range is around a first resonance frequency, where the resonance reaches a maximum. The first resonance frequency is below the cable frequency, which means that at the cable frequency the resonance is not at its maximum.

In addition, transformers have a limited maximum power transfer above which they saturate. Therefore, at least over a saturation frequency range the transfer pick-up circuit will cause the transformer to saturate. Therefore, when in practise the second circuit forms an infinite load at the cable frequency, the transfer pick-up circuit will pick-up less energy from the cable than when the transformer would saturate. In other words, there is a decoupling of the transfer pick-up circuit from the cable.

This decoupling can be advantageous in several situations. As the second circuit comprises means to transfer power to a load, the impedance of the second circuit depends on the impedance of the load (and therefore also on the presence of a load). Moreover, the resistance of the second circuit rises with a rising resistance of the load. When the second circuit is only closed by the presence of the load (i.e. when it is open without a load being present), the resistance of the second circuit reaches a maximum when there is no load connected. Switching off the load may have the same effect. In combination with the decoupling at high impedance of the second circuit, this means that there is decoupling at high impedance of the load and especially when there is no load connected. This for instance means that there is a relatively low power loss when there is no load present or when the load is switched off and indeed in such situations it is desired that power loss is minimal.

To achieve this decoupling, a controller is not required. Because no controller is required, the power transfer pick-up is relatively cheap and reliable. Instead, the difference in coupling is achieved by the different resonant properties of the transfer pick-up circuit depending on the impedance of the load itself.

The inventors realized that because the magnetic inductance of the transformer is separate from the magnetic inductance of the inductive module, they could advantageously have more freedom to increase the difference between the first resonance frequency and the cable frequency without deteriorating the ability to transfer power to a load in comparison to the situation wherein the load would be parallel to the first circuit without being in series with the second inductive module.

In a preferred embodiment the second circuit comprises a second capacitive module arranged in series with the second inductive module and parallel to the means, wherein the second capacitive module and the second inductive module are arranged for having a second resonance in a second frequency range around a second resonance frequency when in practise the load impedance is infinitely high and wherein the second resonance is arranged such that the impedance of the transfer pick-up circuit is lower than the impedance of the first circuit at the cable frequency when in practise the load is infinitely high.

By having a capacitive module in the second circuit, even with an infinitely high impedance of the load, the second circuit plays a role in the transfer pick-up circuit. Moreover, the second circuit has a second resonance. Because the second circuit has the second capacity module in series with the second inductive module, the impedance of the second circuit is low at the resonance with a minimum at the second resonance frequency. As the second circuit is parallel to the first circuit, a low impedance of the second circuit causes the impedance of the transfer pick-up circuit to be low.

Because in this embodiment the transfer pick-up circuit has a lower impedance than the first circuit, the power picked up from the cable is further reduced at the cable frequency when in use the load forms an infinitely high impedance.

When the impedance of the load is lowered, at the cable frequency the load becomes more dominant with respect to the second capacitive module, effectively diminishing the series resonance. This makes power transfer to the load possible. In the case where the load impedance approaches zero, the second capacitive module is completely bypassed and the behaviour of the circuit with or without a second capacitive module becomes equal.

Preferably, at the cable frequency the impedance of the second circuit is lower than the impedance of the first circuit when in practice the load impedance is infinitely high.

Because the impedance of the second circuit is lower than the impedance of the first circuit, the impedance of the transfer pick-up circuit is significantly reduced.

In the preferred embodiment, preferably the means comprise a rectifier arranged to supply the load from the output side of a rectifier and a capacitive reservoir module connected to the output side of the rectifier arranged to be in parallel to the load.

Because the means are parallel to the second capacitive module and are arranged to supply the load from an output side of the rectifier, an increasing load resistance still leads to an increased resistance of the second circuit.

Because the capacitive reservoir module is in parallel to the load and behind the rectifier, there is a reservoir of energy for the load so ripple that may be present on the output side of the rectifier in the voltage and current is smoothed out.

Preferably the means comprise a third inductive module arranged to be in series with the load and the capacitive reservoir module.

The capacitive reservoir module loads when the alternating voltage on the output side of the rectifier reaches a threshold value. Therefore it loads at the tops of an alternating voltage on the output side of the rectifier. This loading characteristic may disturb the resonance of the resonant transfer pick-up circuit. The advantage of the inductance of the third inductive module is that the resonant circuit is loaded relatively evenly and that the secondary resonant circuit is less disturbed.

Preferably, a source for providing the alternating supply current wherein the source is arranged to vary the cable frequency.

Because the source can vary the cable frequency, the impedance of the power transfer pick-up on the cable can be varied to accommodate for the number of inductively coupled power transfer pick-ups coupled to the cable. Also, switching between frequencies can be used as a signal for an inductively coupled power transfer pick-up coupled to the cable.

Embodiments of the invention will now be described by way of example only, with reference to the accompanying schematic drawings in which corresponding symbols indicate corresponding parts.

FIGURES

Figure 1:
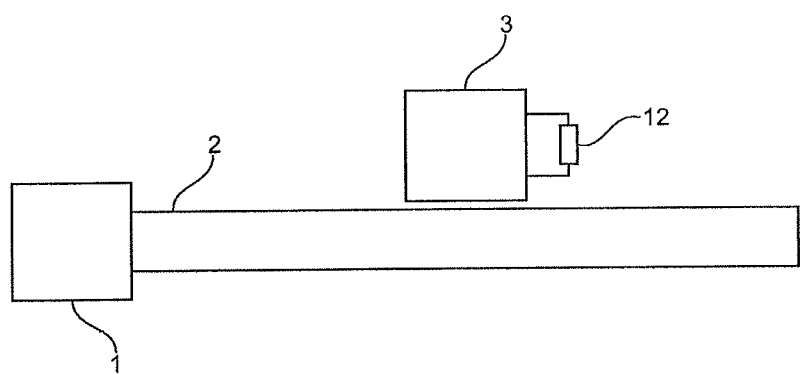
FIG. 1 depicts an inductively coupled power transfer system according to the invention
Figure 2A:
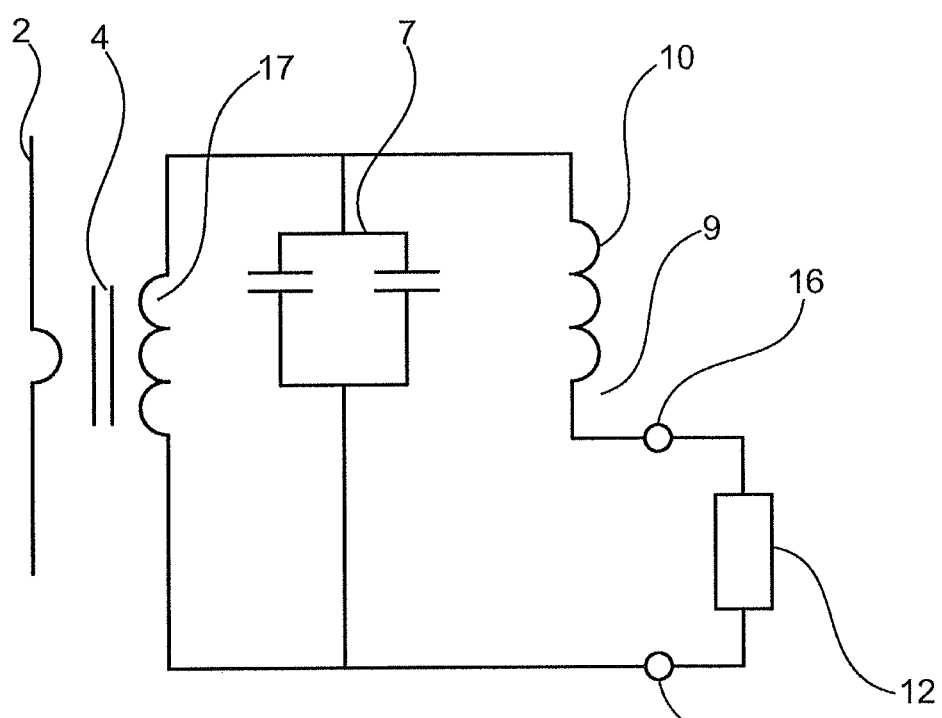
FIG. 2a depicts an electrical circuit representation of the inductively coupled power transfer system of FIG. 1
Figure 2B:
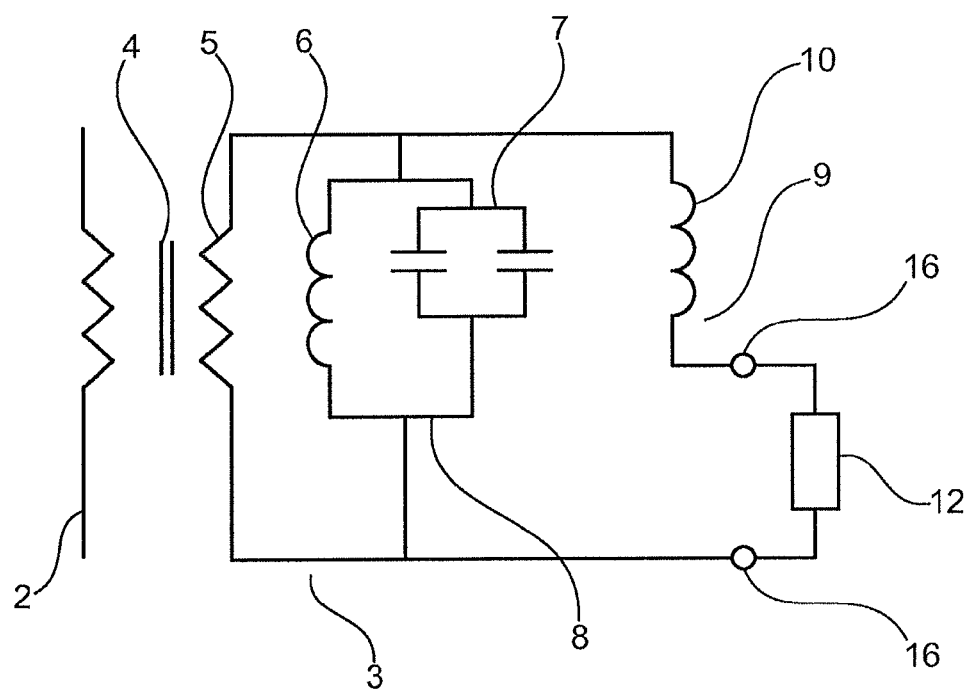
FIG. 2b depicts an electrical circuit representation of the inductively coupled power transfer system of FIG. 1
Figure 3:
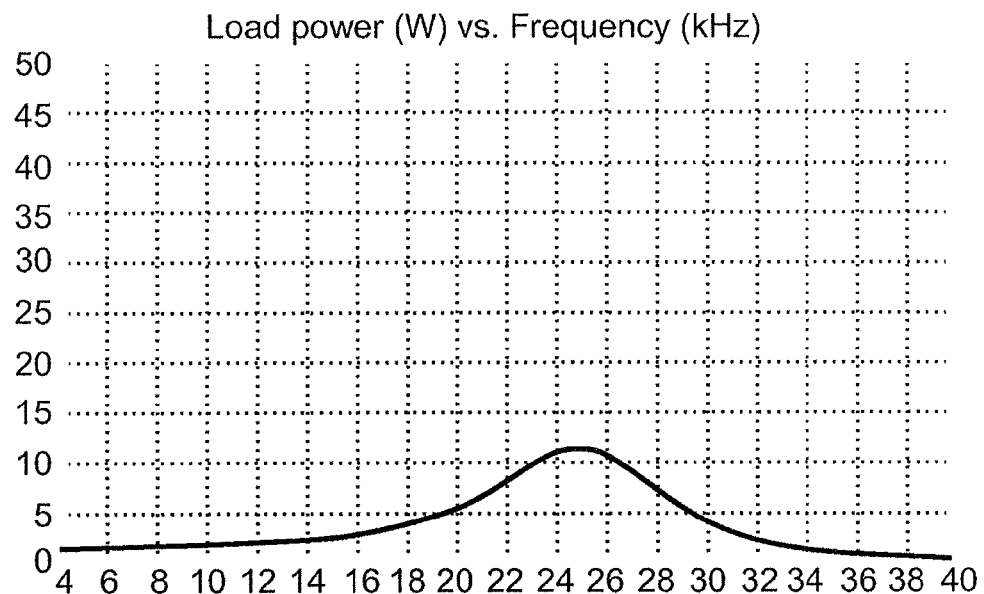
Figure 4:
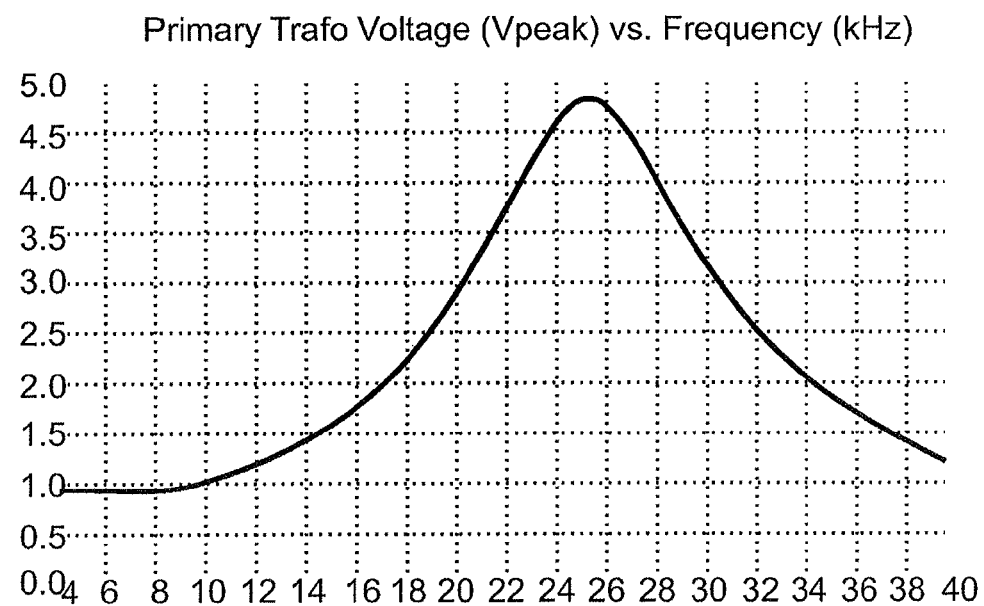
Figure 5:
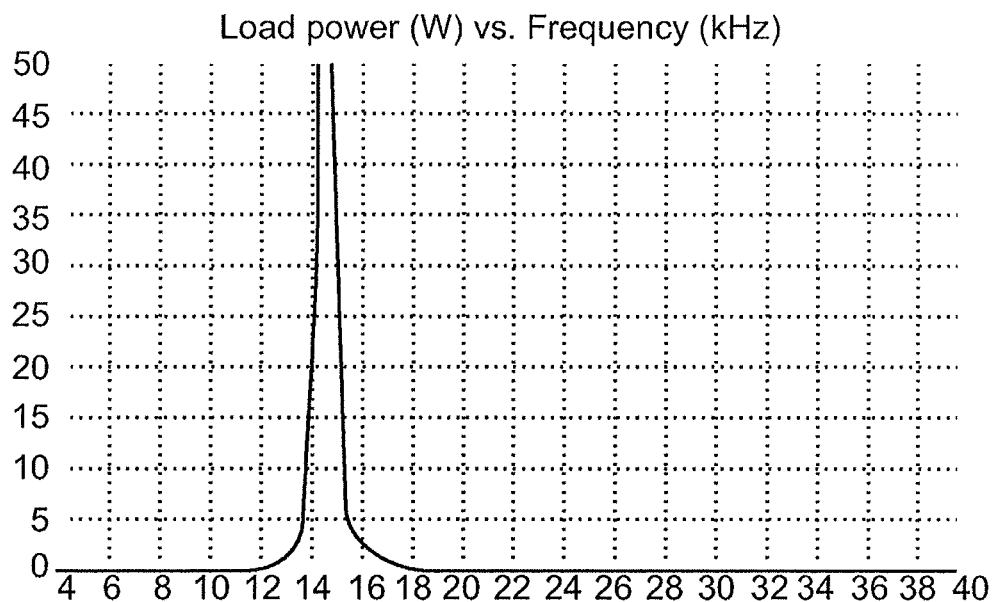
Figure 6:
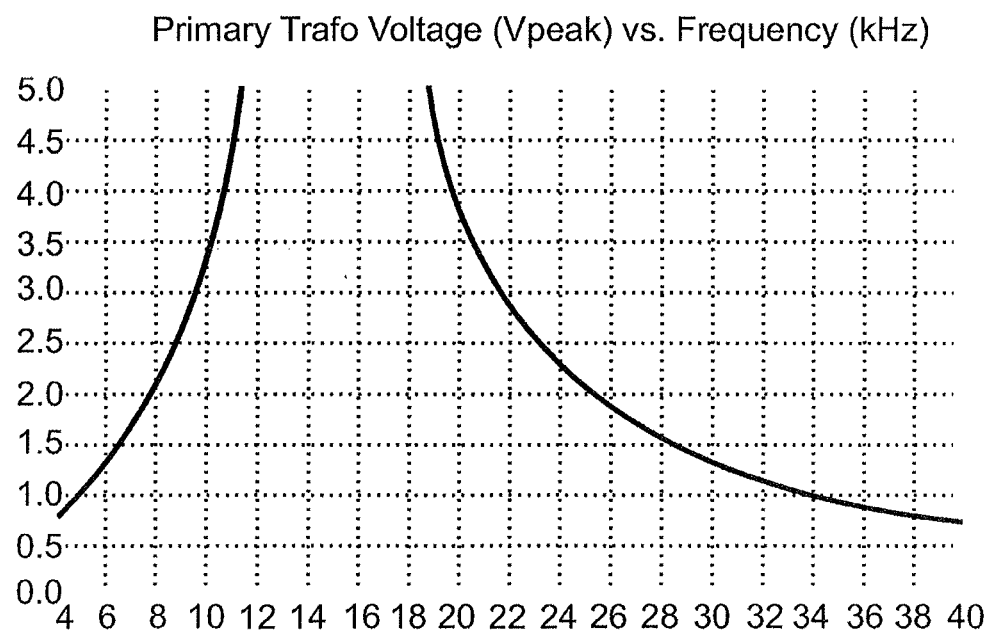
Figure 7:
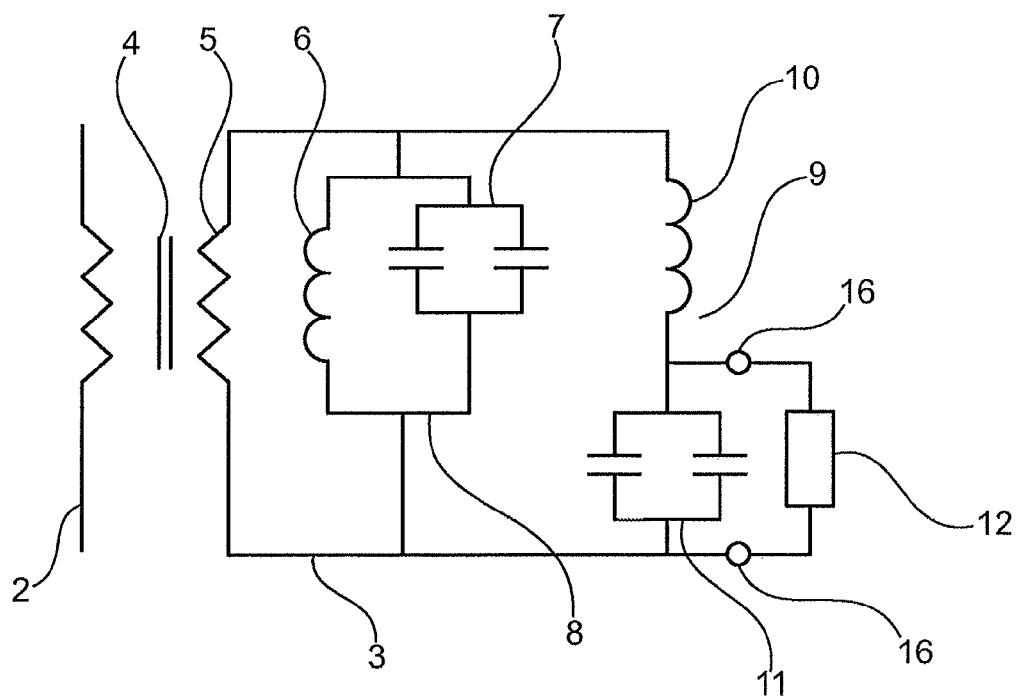

FIG. 3 depicts the power picked up from the cable at different frequencies when the load is at a nominal value in the transfer pick-up circuit of FIG. 2b FIG. 4 depicts the maximum primary transformer voltage at different frequencies when the load is at a nominal value in the transfer pick-up circuit of FIG. 2b FIG. 5 depicts the power picked up from the cable at different frequencies with a very high impedance as load to the transfer pick-up circuit of FIG. 2b FIG. 6 depicts the maximum primary transformer voltage at different frequencies with a very high impedance as load to the transfer pick-up circuit of FIG. 2b FIG. 7 depicts an electrical circuit representation of the inductively coupled power transfer system of FIG. 1

Figure 8:
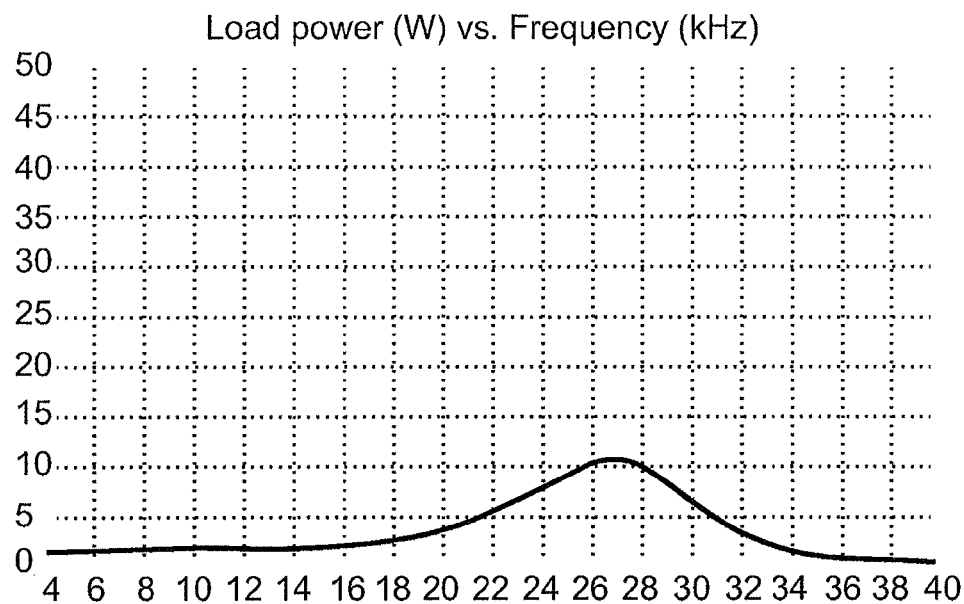

FIG. 8 depicts the power picked up from the cable at different frequencies when the load is at a nominal value in the transfer pick-up circuit of FIG. 7

Figure 9:
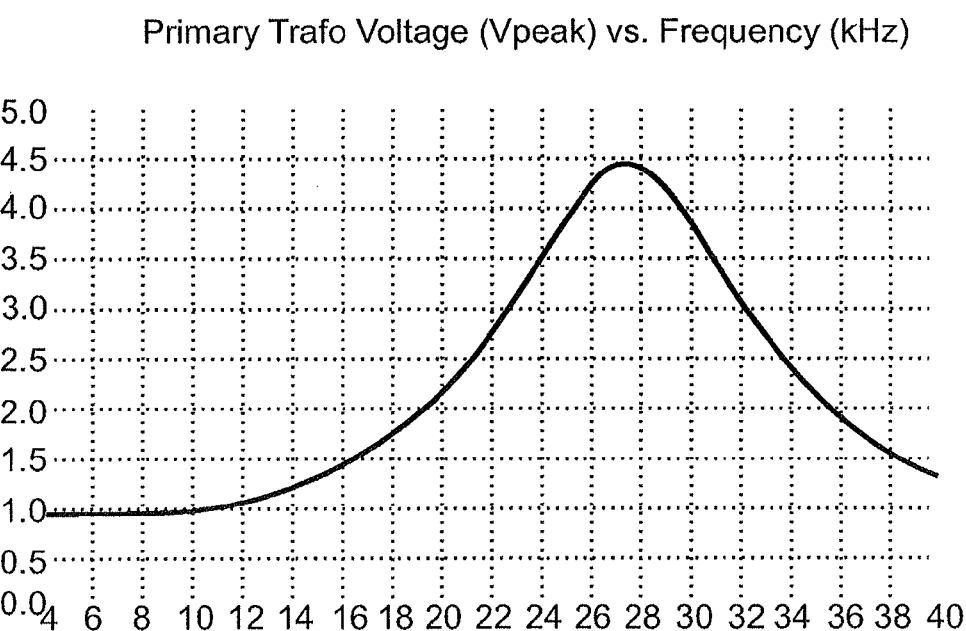

FIG. 9 depicts the maximum primary transformer voltage at different frequencies when the load is at a nominal value in the transfer pick-up circuit of FIG. 7

Figure 10:
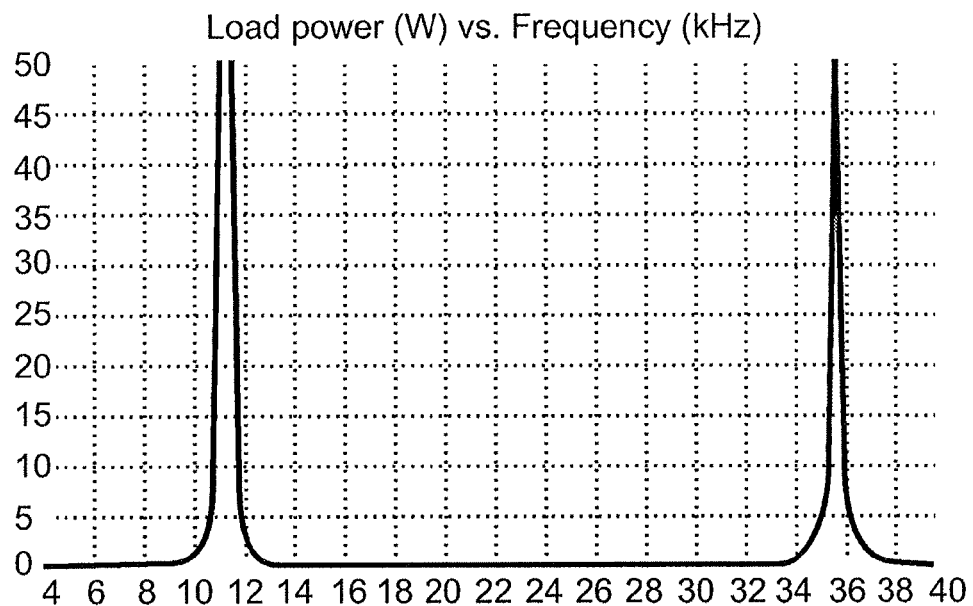

FIG. 10 depicts the power picked up from the cable at different frequencies with a very high impedance as load to the transfer pick-up circuit of FIG. 7

Figure 11:
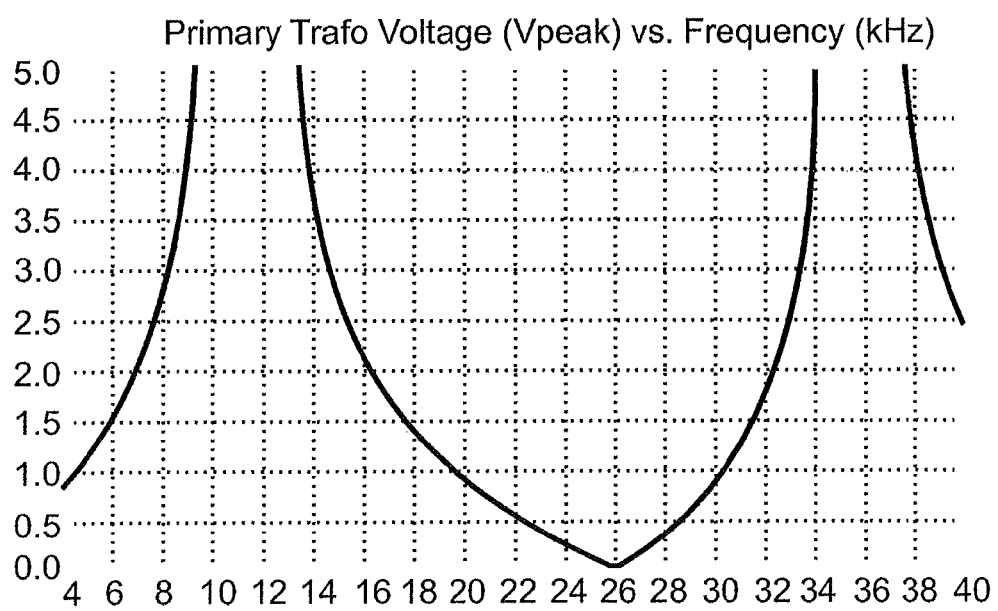

FIG. 11 depicts the maximum voltage over the primary transformer voltage at different frequencies with a very high impedance as load to the transfer pick-up circuit of FIG. 7

Figure 12:
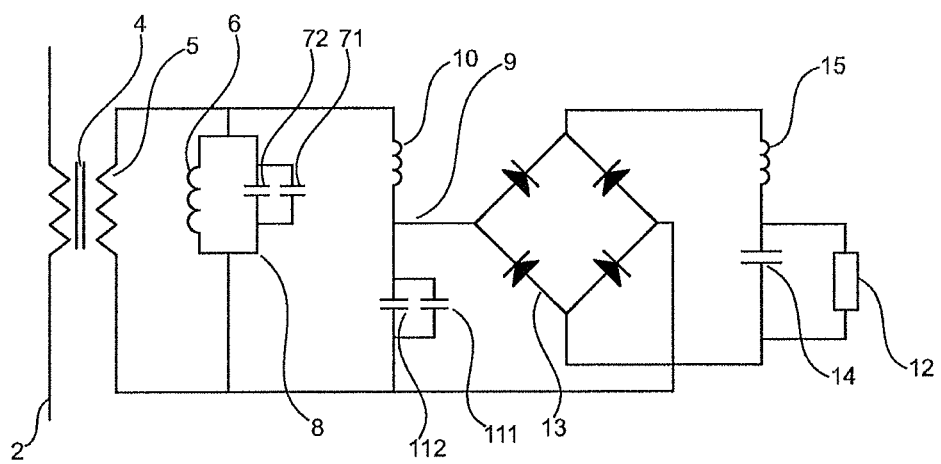

FIG. 12 depicts an alternative detail of the inductively coupled power transfer system of FIG. 1

DESCRIPTION

Example without Capacitive Module in Transfer Circuit

In an example according to an embodiment of the invention, a power supply (1) is arranged to supply an alternating current to a cable (2) with a current source. This is shown in FIG. 1. A power transfer pick-up (3) comprising a ferrite element (4) is placed in proximity to the cable (FIG. 2a and FIG. 2b). The power transfer pick-up further comprises a secondary winding (17) around the ferrite element (4). The ferrite element (4) forms the core of a transformer and is at least partially within the secondary winding. The power transfer pick-up (3) is placed such that there is an inductive coupling between the cable (2) and the power transfer pick-up (3).

FIG. 2a shows an electrical circuit diagram of the power transfer pick-up (3). The power transfer pick-up (3) further comprises a first capacitive module (7). The first capacitive module (7) is connected in parallel to the secondary winding (17) and the combination of the first capacitive module and the secondary winding forms a first circuit (8).

For the purpose of explaining the invention using electrical circuit drawings, the secondary winding can be modelled as the secondary part (5) of an ideal transformer and a first inductive module (6) parallel to the secondary part (5) of the ideal transformer. The first inductive module (6) represents the magnetizing inductance of the transformer. FIG. 2b shows the electrical circuit diagram of the power transfer pick-up using this model. The power transfer pick-up further comprises a second circuit (9) connected in parallel to the first circuit (8). The second circuit (9) comprises a second inductive module (10).

In FIG. 2a and FIG. 2b the circuit diagram is shown with a load connected to the second circuit (9) via connection means (16) which are in series with the second inductive module (10). The connection means (16) are formed by a pair of receptacles for a plug.

The load is a switchable light bulb. The light bulb is switched on and off at demand, which means that the load varies. The light bulb is resistive. When the light bulb is off, the resistance of the light bulb is infinitely high. When the light bulb is on, the resistance has a nominal value. The load is connected to the means by a plug. This facilitates a fast and easy exchange of the light bulb.

The first circuit and the second circuit together form a transfer pick-up circuit that is resonant. For the purpose of explaining the invention and the choice of values for the components in the transfer pick-up circuit, several different situations will be described.

The first capacitive module (7) has a capacitance Cp with a value of about 64 nF. The second inductive module (10) is a coil with an inductance Ls of 820 uH. The first inductive module (6) has a value Lp of 1944 uH, i.e. the secondary winding of the transformer has an inductance of 1944 uH.

These values have been chosen to arrange that the resonance frequency ($f_{transfer\ pick-up}$) of the transfer pick-up circuit is close to a cable frequency of 26 kHz when the load is a short (i.e. has zero impedance). The values are therefore chosen using $$f_{transfer\ pick-up} = \frac{1}{2\pi\sqrt{\frac{L_p L_s}{L_p + L_s} C_p}}$$

As the skilled man will realise, not all values are readily available for the capacitors, coils and transformers, so that the resonance frequency ($f_{transfer\ pick-up}$) may deviate a little from the exact cable frequency. In this example, a capacitor with a capacitance value of 64 nF is not readily available (i.e. capacitors with this value are not produced by default). Therefore the first capacitive module (7) comprises two capacitors connected in parallel with values 56 nF and 8.2 nF which are default values. Additionally there typically are large production tolerances on capacitors, coils and transformers. For instance, the value of capacitors may vary with 50%, 10%, 5% or 1% and the inductance of a coil may vary with 20% or 10% because of production tolerances. Moreover, resonances occur in a frequency range around a frequency where the resonance is at a maximum.

In this case the combined resonance frequency according to the nominal values of the components has a value of about 26.197 kHz, i.e. it is less than one percent off from the cable frequency.

The alternating current is supplied by a current source of the power supply (1). The power transferred to the load (load power) is shown in FIG. 3 for a range of frequencies. FIG. 3 shows that load power is at or close to maximum for the chosen values.

The above values where chosen for the situation where the load has a value such as intended during use, i.e. has a nominal value. In this case this is about 61Ω.

The values for Lp, Ls and Cp are however chosen by neglecting the nominal load. This is useful to design a circuit wherein the impedance of the load is not (exactly) known yet. When designing the transfer pick-up the impedance values for the light bulb can be used to arrange that the maximum of the peak (which is at the resonance frequency of the transfer pick-up circuit) is as close as possible to the cable frequency by changing the values of Cp, or Lp or Ls. This is done by solving the equation for the complex impedance of the transfer pick-up circuit to have a zero imaginary part for a certain load impedance (Zload) according to $$\Im\{Z_{transfer\ pick-up}\} = \Im\left\{\frac{1}{\frac{1}{j\omega L_p} + j\omega C_p + \frac{1}{j\omega L_s + Z_{load}}}\right\} = 0$$

wherein Z is used to indicate impedance a $\mathfrak{I}$ is used to indicate imaginary parts.

FIG. 4 shows the maximum primary transformer voltage (in the figure referred to as Vpeak) as a function of the cable frequency for the same situation as FIG. 3. The maximum primary transformer voltage is the maximum voltage drop experienced by the cable at the power transfer pick-up. The voltage drop varies over time as the current is an alternating current. As the alternating current is supplied by a current source, the voltage drop experienced by the cable corresponds to the power picked up from the cable.

In case the load has an infinitely high impedance, the power picked up by the power transfer circuit peaks at a different frequency of the alternating current in the cable. In FIG. 5 a situation wherein the load has a very high impedance is shown. The behaviour of the power picked up from the cable when the load has a very high impedance approximates the behaviour when the load has an infinite impedance. FIG. 6 shows the maximum primary transformer voltage for this situation.

The primary transformer voltage is limited to 5.0 V by the core (4) of the transformer. As the core (4) is made from ferrite, it saturates at a flux density of about 0.3 to 0.5 Tesla. The flux density is determined by $$B_{max} = \frac{U_{max}}{2\pi f N A_e}$$

herein $U_{max}$ is the peak voltage over the transformer, $A_e$ is the effective cross section of the core, N is the number of windings and f is the frequency.

If the load has an infinitely high impedance, the second circuit also has an infinitely high impedance and effectively the second circuit is not relevant for the behaviour of the resonant transfer pick-up circuit. The resonance of the transfer pick-up circuit is determined by the first circuit, which has a resonance with a maximum at a frequency around 15 kHz. To distinguish with other resonance frequencies in the power transfer circuit, this resonance frequency will further be referred to as the first resonance frequency.

The relation between the first resonance frequency ($f_{first}$), the magnetizing inductance of the first inductive module and the capacitance of the first capacitive module is given by $$f_{first} = \frac{1}{2\pi \sqrt{L_p C_p}}.$$

This formula is also used to select the values for the magnetizing inductance of the first inductive module and the capacitance of the first capacitive module.

At this first resonance frequency, the core (4) is saturated. Because the core is saturated, the power picked up by the power transfer pick-up is limited and the maximum primary transformer voltage is limited.

As is clear from the frequencies given above, as well as from comparison of FIGS. 3 and 5 or FIGS. 4 and 6, the resonance frequency of the transfer pick-up circuit (the circuit which combines the first circuit (8) and the second circuit (9)) comprising a load with nominal impedance is closer to the cable frequency than the first resonance frequency.

Example with Capacitive Module in Transfer Circuit

In an example according to a preferred embodiment of the invention, the power transfer circuit is as described above, but the second circuit additionally comprises a second capacitive module (11) parallel to the means (16) for transferring power to the load. The second capacitive module (11) is also in series with the second inductive module (10). The second capacitive module (11) has a value Cs for the capacitance. When there is no load connected to the means (16), and taken separately from the rest of the transfer pick-up circuit, the second circuit has a resonance with a maximum (i.e. a minimum impedance) at a second resonance frequency ($f_{second}$) determined by $$f_{second} = \frac{1}{2\pi \sqrt{L_s C_s}}$$

In this example, the nominal value Cs is 44 nF, leading to a value for the second resonance frequency of the second circuit ($f_{second}$) of about 26,496 kHz. Although this deviates less than 2% from the cable frequency, readily available components can be used. The second capacitive module (11) comprises two capacitors connected in parallel with values 22 nF and 22 nF, which are readily available components. The skilled man will appreciate that in other examples of the invention it may be possible to use a single readily available capacitor in the second capacitive module.

FIG. 8 shows the power transferred to the load for this embodiment for different cable frequencies for the situation wherein the load has nominal impedance. As in the earlier example this nominal load impedance is about 61Ω. This FIG. 8 should be compared with FIG. 3 for comparing the situation with and without the second capacitive module. From comparison it will be clear to the skilled person that the behaviour of the transfer pick-up circuit with the second capacitive module (11) is comparable to the behaviour of the transfer pick-up circuit without the second capacitive module (11).

In addition, FIG. 9 shows the maximum primary transformer voltage for this value of the capacity of the second capacitive module (11). FIG. 9 should be compared with FIG. 4, for comparing the situation with and without the second capacitive module. From comparison it will be clear to the skilled person that the behaviour of the transfer pick-up circuit with the second capacitive module (11) is comparable to the behaviour of the transfer pick-up circuit without the second capacitive module (11). The advantage of the presence of the second capacitive module (11) is shown in FIGS. 10 and 11.

FIG. 11 shows the behaviour of the transfer pick-up circuit when the load is very high. The behaviour approximates the situation wherein the load is not present (i.e. has an infinite impedance). In this case, what is shown is the behaviour in the form of the maximum primary transformer voltage as a function of the cable frequency. Here, as in the situation without the secondary capacitive module (11), the maximum primary transformer voltage clips when the core (4) saturates in a frequency range, but not at the cable frequency. As discussed above, the second circuit has a second resonance frequency at the cable frequency (i.e. it deviates as much as to allow for the use of components with default values as available on the market). As the second circuit is a series circuit, the second circuit forms a short (parallel to the first circuit) at the second resonance frequency. The cable frequency is not exactly the second resonance frequency, but at the cable frequency, the impedance of the second circuit is still low. The advantage of the second capacitive module is that at the cable frequency of 26 kHz, the transfer pick-up circuit forms a lower impedance to the cable than the first circuit would. In this example even the maximum primary transformer voltage is negligible because the impedance of the second circuit is very low and much lower than the impedance of the first circuit. This corresponds to the power picked up from the cable being negligible at the cable frequency of 26 kHz in FIG. 10. This means that because of the presence of the second capacitive module (11) and with the values of the first inductive module, the second inductive module, the first capacitive module and the second capacitive module at this cable frequency, if there is no load connected to the power transfer pick up (or if the load is switched off) there is no power picked up from the cable (2) and the power transfer pick-up (3) will not influence the inductively coupled power transfer system to which it is coupled.

Like FIG. 11, FIG. 10 shows the behaviour of the transfer pick-up circuit when the load is very high as an approximation of the behaviour when the load not present in the form of the power transferred to the load as a function of the cable frequency. The transfer pick-up circuit now has third resonance frequency, which is above the cable frequency.

Example with Rectifier

In a further embodiment (FIG. 12) the first capacitive module (7) comprises two capacitors (71,72) connected in parallel to each other, wherein one capacitor (71) has a value of 33 nF and the other capacitor (72) has a value of 100 nF.

In the embodiment the secondary capacitive module (11) also comprises two capacitors (111,112) connected in parallel to each other. One capacitor (111) has a value of 4.7 nF and the other capacitor has a value of 56 nF.

The magnetizing inductance (Cp) of the secondary winding has a value of 847 uH and the inductance of the second inductance module has a value of 1000 uH.

With these values the transfer pick-up circuit is arranged to pick-up power from the cable when the cable frequency switches between 20 kHz and 21 kHz. This means that the cable frequency is in a cable frequency range of 20 kHz to 21 kHz with 21 kHz being the upper frequency limit. The intended impedance of the load, in this example a LED-light is 220Ω. The resonance frequency of the transfer pick-up circuit is within the cable frequency range. When a load with the intended impedance is connected, the resonance frequency is also within the cable frequency range.

The power transfer pick-up further comprises a rectifier circuit (13). The rectifier is arranged to provide a unidirectional (but still varying) voltage at its output side.

On the output side there is a capacitor (14) of 47 μF. The load (12) is connected parallel to the capacitor. Both the capacitor (14) and the load (12) are connected to the rectifier (13) in series with an inductor (15) of 820 μH.

While specific embodiments of the invention have been described, it will be appreciated by the person skilled in the art that the invention may be practised otherwise than as described, but still according to the teachings of the invention. For instance, the power transfer system can comprise more than one power transfer pick-up and supply power to a combination of loads of different nature such as switched mode power supplies, resistors and LED-lamps. The loads can also be sensors. The sensors can also communicate via the power transfer pick-up to other components connected to the cable (2). Additionally the second inductive module may comprise one or more coils. Furthermore, the rectifier may be a half-wave rectifier. Also, the second resonance frequency may deviate from the cable frequency such that when the load has an infinite impedance, the impedance of the second circuit is smaller than the impedance of the first circuit by at least a factor of 10, 20, 50 or 100.

The invention claimed is:

1. A power transfer system comprising a transfer pick-up circuit for inductively picking up power from a cable carrying an alternating supply current, the alternating supply current alternates at a cable frequency, wherein said transfer pick-up circuit comprising:
   a first circuit comprising a secondary winding of a transformer for providing an inductive coupling to the cable and a first capacitive module connected in parallel to the transformer, wherein the first circuit has a first resonance in a first frequency range around first resonance frequency, and
   a second circuit connected in parallel to the first circuit and comprising a second inductive module and means to transfer power to a load, the means being in series with the second inductive module,
   wherein the first circuit and the second circuit together form the transfer pick-up circuit that is resonant, and wherein a resonance frequency of the transfer pick-up circuit comprising the load with nominal impedance, is closer to the cable frequency than the first resonance frequency.

2. The power transfer system according to claim 1, wherein
   the first resonance frequency is below the cable frequency and the power transfer system is arranged such that when in use the second circuit forms an infinitely high impedance, the transformer is not saturated at the cable frequency.

3. The power transfer system according to claim 2, wherein
   the second circuit comprises a second capacitive module arranged in series with the second inductive module and parallel to the means and wherein
   the second capacitive module and the second inductive module are arranged for having a second resonance in a second frequency range around a second resonance frequency when the load impedance is infinitely high and wherein the second resonance is arranged such that the impedance of the transfer pick-up circuit is lower than the impedance of the first circuit at the cable frequency when the load is infinitely high.

4. The power transfer system according to claim 3, wherein at the cable frequency the impedance of the second circuit is lower than the impedance of the first circuit when in practice the load impedance is infinitely high.

5. The power transfer system according to claim 3, wherein the means comprise a rectifier arranged to supply the load from an output side of the rectifier and a capacitive reservoir module connected to the output side of the rectifier arranged to be in parallel to the load.

6. The power transfer system according to claim 5, wherein the means comprise a third inductive module arranged to be in series with the load and the capacitive reservoir module.

7. The power transfer system according to claim 1 comprising a source for providing the alternating supply current wherein the source is arranged to vary the cable frequency.

8. The power transfer system according to claim 1, wherein an inductance of the secondary winding, a capacitance of the first capacitive module, and an inductance of the second inductive module are chosen such that the resonance frequency of the transfer pick-up circuit is close to the cable frequency when the load is a short.

9. The power transfer system according to claim 5, wherein the rectifier is arranged in parallel to the second capacitive module.

10. The power transfer system according to claim 6, wherein the third inductive module is connected to the output side of the rectifier.

11. The power transfer system according to claim 1, wherein the second inductive module, the first capacitive module and the secondary winding of the transformer together form a low pass filter for noise in the direction of the cable.

\* \* \* \* \*